No. 846,069. PATENTED MAR. 5, 1907.
B. H. UHRICH.
REVOLVING DOOR STRUCTURE.
APPLICATION FILED OCT. 21, 1905.
6 SHEETS—SHEET 3.
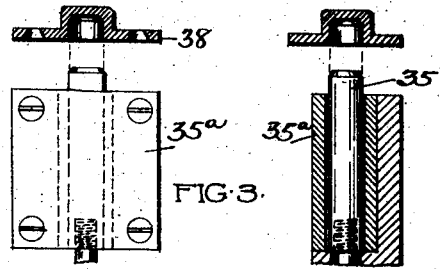
FIG. 3.
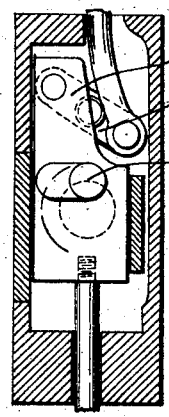
FIG. 4.
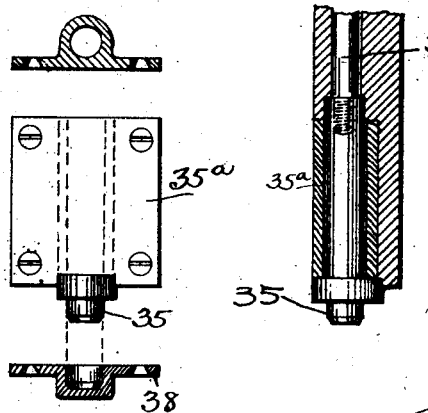
FIG. 5.
FIG. 8.
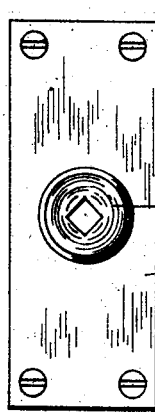
FIG. 6.
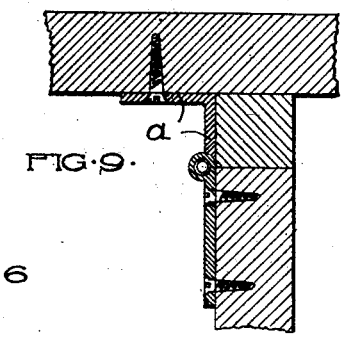
FIG. 7.
FIG. 9.
WITNESSES:
L. E. Witham.
Arthur E. Sowell.
INVENTOR.
Burns Hull Uhrich
BY
Robertson & Johnson
ATTORNEYS No. 846,069. PATENTED MAR. 5, 1907.
B. H. UHRICH.
REVOLVING DOOR STRUCTURE.
APPLICATION FILED OCT. 21, 1905.

6 SHEETS—SHEET 4.

WITNESSES:
L. E. Witham.
Arthur E. Dowell.

INVENTOR.
Burns Hull Uhrich
BY
Robertson Johnson
ATTORNEYS.

No. 846,069. PATENTED MAR. 5, 1907.
B. H. UHRICH.
REVOLVING DOOR STRUCTURE.
APPLICATION FILED OCT. 21, 1905.
6 SHEETS—SHEET 5.
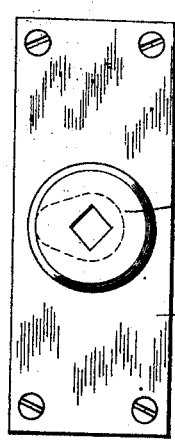
FIG. 16.
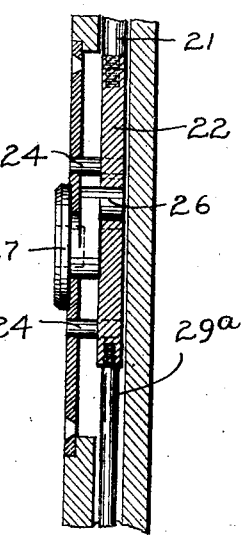
FIG. 17.
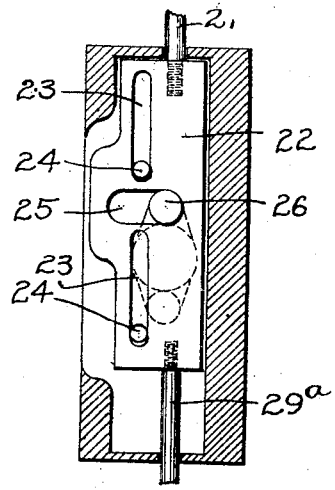
FIG. 18.
FIG. 19.
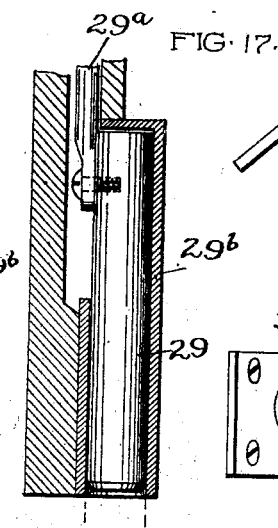
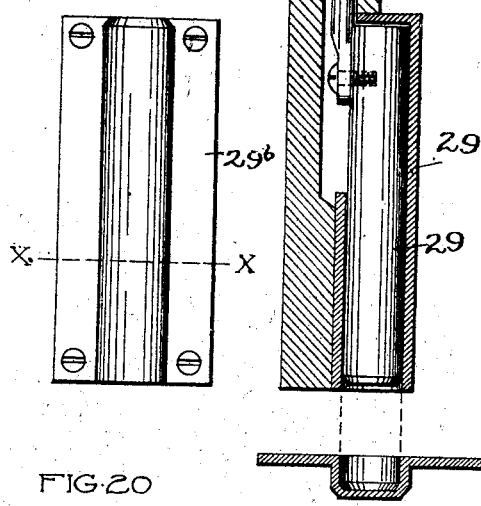
FIG. 20
FIG. 21.
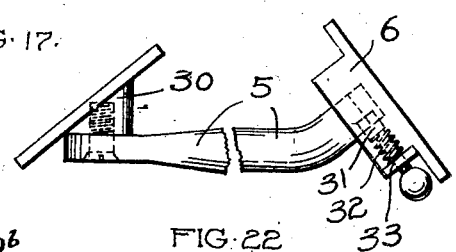
FIG. 22
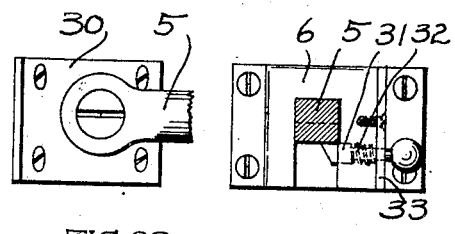
FIG. 23.
FIG. 24.
WITNESSES:
L. E. Witham.
INVENTOR.
Burns Hull Uhrich
BY
Robertson Johnson
ATTORNEYS No. 846,069.　　　　　　　　　　　　　　　　PATENTED MAR. 5, 1907.
B. H. UHRICH.
REVOLVING DOOR STRUCTURE.
APPLICATION FILED OCT. 21, 1905.

6 SHEETS—SHEET 6.

Witnesses
M. A. Tanner
H. F. Robertson

Inventor
Bruno Hull Uhrich
By Robertson & Johnson
Attorneys

UNITED STATES PATENT OFFICE.

BURNS HULL UHRICH, OF ATCHISON, KANSAS.

REVOLVING DOOR STRUCTURE.

No. 846,069.  Specification of Letters Patent.  Patented March 5, 1907.

Application filed October 21, 1905. Serial No. 283,864.

*To all whom it may concern:*

Be it known that I, BURNS HULL UHRICH, of Atchison, in the county of Atchison and State of Kansas, have invented certain new and useful Improvements in Revolving Door Structures, of which the following is a specification.

This invention relates to certain new and useful improvements in revolving door structures such as are now quite commonly used, the objects of my invention being to provide a door of good appearance and of simple construction, with means for giving a wider opening when not in use and for doing away with unsightly slots in the ceiling and any projections of the wings beyond the casing when folded.

With these objects in view my invention consists in the storm-door structure, as will be now hereinafter more particularly described and then definitely set forth by the claims at the end hereof.

Figure 1:
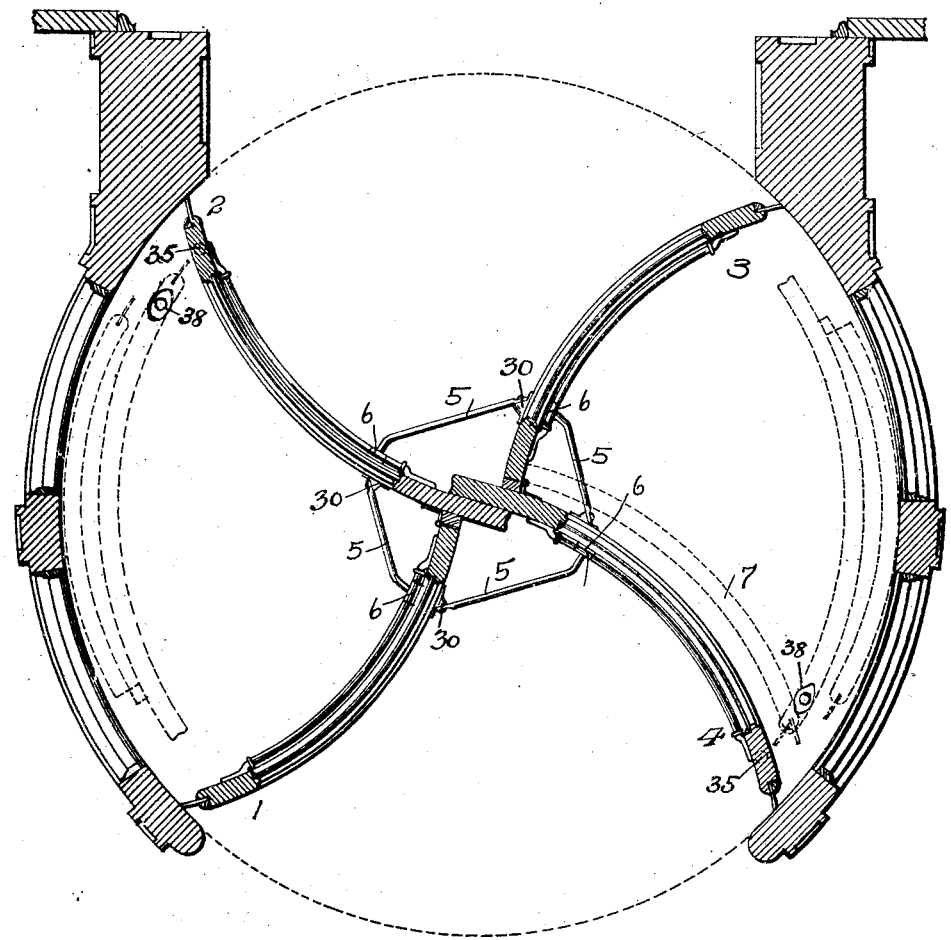
Figure 2:
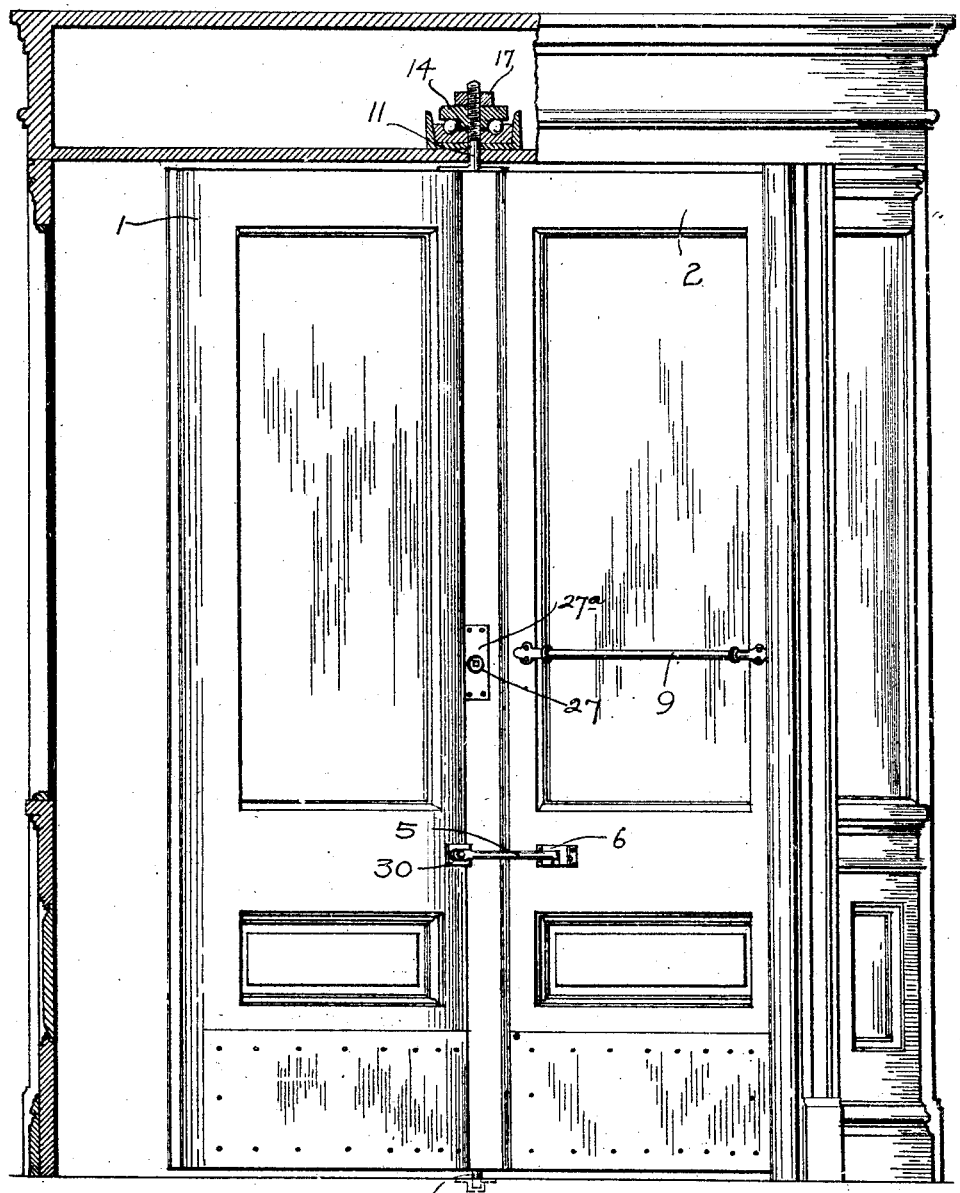
Figure 10:
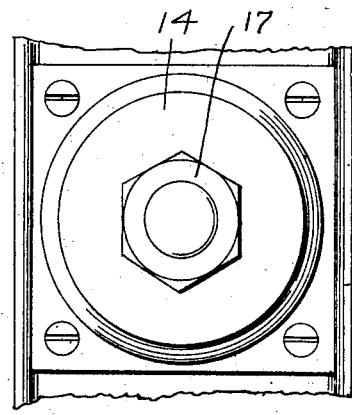
Figure 12:
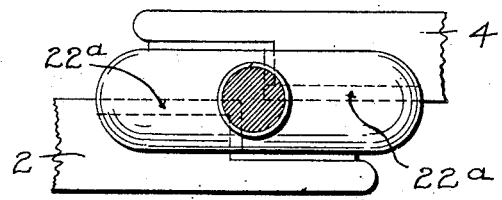
Figure 13:
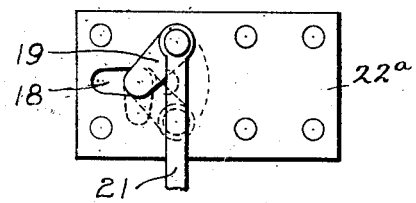
Figure 11:
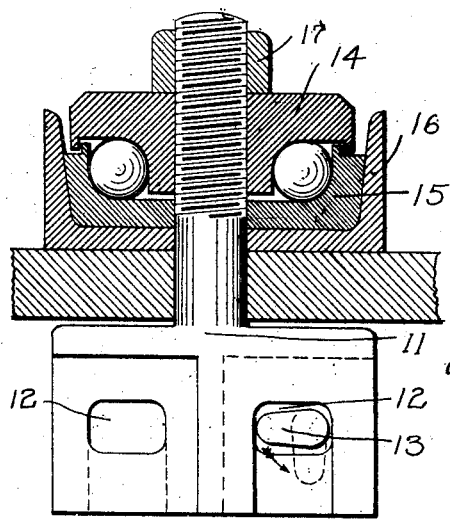
Figure 14:
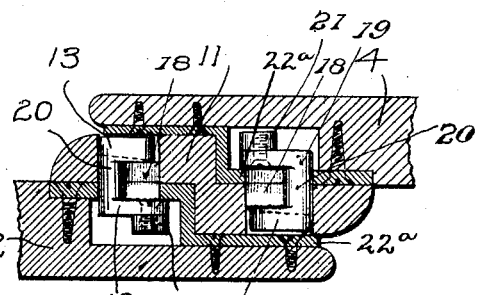
Figure 15:
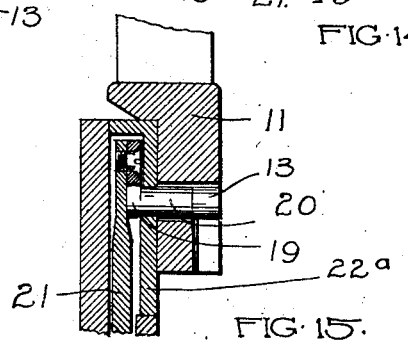
Figure 25:
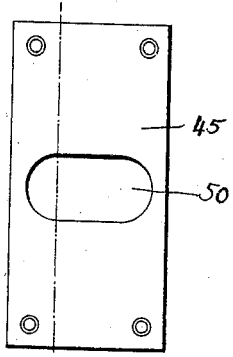
Figure 26:
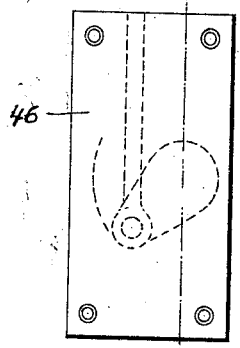
Figure 27:
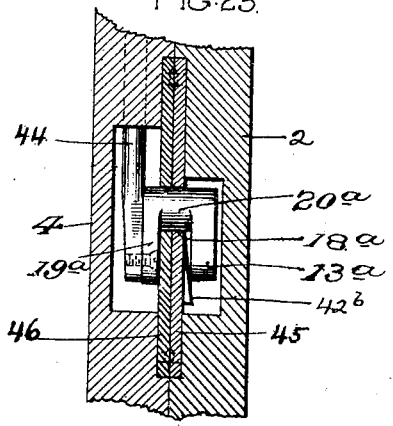
Figure 28:
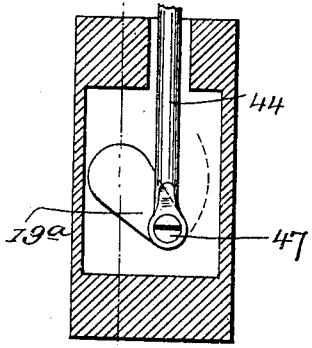

In the drawings accompanying and forming part of this application, and which represent the preferable though not necessary embodiment of my invention, Figure 1 is a horizontal section of a revolving door structure, showing my invention with the curved wings shown in full lines in position for use and in dotted lines in the positions they occupy when folded. Fig. 2 is a view, partly in side elevation and partly in section, of the same, except that this view of course shows the ceiling and the rotary support, &c. Fig. 3 shows the upper pivot located at the outer edges of two of the wings, together with the socket for the same. Fig. 4 shows in sectional view the actuating mechanism for the pivots at the outer ends of two of the wings. Fig. 5 shows a series of details comprising the lower pivot and its socket, the pivot being operated by the means shown in Fig. 4. Fig. 6 is a vertical section through the entire structures shown in Figs. 3, 4, and 5. Fig. 7 is a front elevation of the face-plate and operating-disk. Fig. 8 shows a face view of one of the sockets of the outer pivots. Fig. 9 is a section showing the hinge by which the wings are connected together. Fig. 10 is a top plan view of the ball-bearing support for the rotating wings. Fig. 11 is a sectional view of said ball-bearing support. Fig. 12 is a detail showing the relation of the revolving part of the rotating hanger and the wings. Fig. 13 is a rear view of one of the plates fastened to the wings carrying part of the locking mechanism. Fig. 14 is a horizontal section of part of the wings and part of the locking mechanism. Fig. 15 is a vertical section of the structure shown in Fig. 14. Fig. 16 is an elevation of the face-plate and operating-disk by which the main lock is operated. Fig. 17 is a vertical section of a detail showing the main locking mechanism. Fig. 18 is a sectional detail looking at the rear of Fig. 17. Fig. 19 is a horizontal section, and Fig. 20 is an elevation, of the socket for the lower pivot. Fig. 21 is a sectional detail of the lower pivot and its socket. Figs. 22, 23, and 24 are details showing the drop-arm and its parts for locking the wings when in position. Figs. 25, 26, 27, and 28 are detail views of mechanism for locking the two sections together.

Referring now to the details of the drawings by numerals, and particularly to Fig. 1, it will be observed that the revolving part of the door consists of four wings 1, 2, 3, and 4. The wings 2 and 4 are formed with wide overlapping stiles, which are locked to each other and to the center bearing by means which will be hereinafter described. The wings 1 and 3 are hinged, respectively, to the wings 2 and 4 by means of hinges of the form shown in Fig. 9, and these wings 1 and 3 may be folded against the wings 2 and 4, as illustrated in dotted lines in Fig. 1, or they may be opened to the full position. (Shown in full lines in Fig. 1.) When they are in the position shown in full lines in said Fig. 1, they are held in said position by means of drop-arms 5. These drop-arms 5 are pivotally supported at one end in sockets 30 and coact with catches 6 upon the other wing, as illustrated in Fig. 2. In Figs. 22, 23, and 24 these drop-arms and their parts are clearly shown. As there illustrated, the drop-arms are pivoted to the members 30, while their opposite ends are bent to enter the catches 6, which contain a latch 31, normally held in place by a spring 32 and cover-plate 33. To release the latch so that the drop-arm will fall out of the catches 6, it is only necessary to slightly withdraw the latch 31 by pulling on the knob at its end, when the drop-arm will be released and may drop down against the side of the wing in a manner easily understood. When these drop-arms are released and in their downward position, the wings 1 and 3 may be moved on their hinges, so as to fold against the wings 2 and 4, and it may now be observed that these wings instead of being formed of straight or plane surfaces are curved, so that when they are folded in position they will not only fit close to each other, but will also be close to the interior wall of the circular casing, as clearly shown in dotted lines in Fig. 1. I deem this of great importance.

In order to properly support the wings 1, 2, 3, and 4 and allow their proper rotation, I employ a hanger shown particularly in Figs. 2, 10, and 11. This hanger or rotating support is marked 11 in Fig. 11, and its shape is more particularly shown in Fig. 14. The upper end of this hanger or rotating support 11 is provided with a threaded shaft end on which is screwed a steel cone 14 of the ball-bearing, a steel cup-plate 15 being bolted to the steel channel-iron 16, running transversely of the door structure. The cone is prevented from turning independently of the shaft end by means of a lock-nut 17, the whole forming an antifriction bearing-support requiring no oiling or other attention. The hanger or rotating support 11 is of the peculiar shape shown in Figs. 11 and 14 and has two offset portions, leaving spaces for the operating mechanisms hereinafter described. The wings 2 and 4 when they are in the position shown in full lines in Fig. 1 have their stiles fitting on opposite sides of the offset hanger or rotating support 11, as shown in Figs. 12 and 14. The wings, as shown in these figures, are cut away and faced with recessed plates 22$^a$, screwed to the wings, as clearly shown in Fig. 14. These plates 22$^a$ are so formed as to leave a space within which works part of the locking mechanism.

The mechanisms for locking the wings 2 and 4 to the hanger or rotating support 11 comprise the following elements: A rock-shaft 20 with crank-arm 19 and locking-arm 13 is slipped through slot 18 in one of the face-plates 22$^a$ before said plate is secured in position, and to rock this shaft 20 I employ a rod 21 and other connections, which will be described. The hanger or rotating support 11 is provided with recesses 12, and when the wing 2 is moved up against this hanger or support 11 the lock-arm 13 projects through one of the slots 12. The operating mechanism may then be moved so that the rod 21 rocks shaft 20 and moves the locking-arm 13 from the horizontal unlocked position (shown in full lines in Fig. 11) to the vertical locking position. (Shown in dotted lines in said figure.) The wing 2 will now be locked to the hanger or rotating support 11, so that it may rotate therewith. On the floor in vertical alinement with the shaft or rotating support 11 is secured a floor-socket. (Shown in Fig. 21 and also in dotted lines in Fig. 2.) The lower pivot 29, which coacts with this socket, works through a socket 29$^b$, secured to the lower end of the wing 2, so that it may be projected through the socket 29$^b$ into the floor-socket in order that the wings may have a bottom pivot on which to turn. In order to simultaneously operate the rock-shaft 20 and the bottom pivot 29, the two operating-rods 21 and 29$^a$ are connected to a sliding plate 22, working within a recess near the center of the wing 2. This sliding plate 22 is provided with slots 23, and pins 24 are provided to regulate the movement of said plate. Said plate 22 is also provided with a horizontal slot 25, which receives a crank-pin 26, projecting from a crank-arm formed on or connected to a revolving disk 27, located on the exterior of a face-plate 27$^a$. (See Figs. 2, 16, and 17.) The revolving disk 27 has a square socket to receive a suitable handle or wrench, and the construction of the parts is such that when this disk 27 is given a half-revolution the rotary motion of the disk through the crank-arm and pin 26 is converted into a reciprocating motion of the sliding plate 22 and its rods 21 and 29$^a$. Thus when the parts are in the positions shown in Figs. 17 and 18 the rods 21 and 29$^a$ are both in their upper positions, and hence the pivot 29 is withdrawn from the floor-socket and the crank-arm 19 is moved upward, so as to move the locking-arm 13 to the horizontal or unlocked position. (Shown in Fig. 11.) It will thus be seen that by the single movement of the revolving disk 27 the wing 2 may be unlocked from the hanger or rotating support 11 and at the same time have its bottom pivot withdrawn from the floor-socket, so that this wing 2 is absolutely free from any support at the center.

In order to lock wings 2 and 4 together, I employ locking mechanism similar to that just described and as shown in Figs. 25 to 28, inclusive. Wing 2 is provided with a plate 45, in which the elongated horizontally-disposed slot 50 is located. Wing 4 is similarly provided with a plate 46, and in an orifice in this plate the shaft 20$^a$ turns. This shaft 20$^a$ is provided with a locking-arm 13$^a$, which enters the slot 18$^a$, and it is adapted to have a quarter-turn against the cam-surface 42$^b$ of plate 45, whereby to draw the wings securely together. A crank-arm 19$^a$ is secured on the shaft 20$^a$, and the rod 44 is connected with wrist-pin 47 on this crank. Rod 44 is operated by the same mechanism as shown in Figs. 17 and 18 and as previously described. Thus it is seen that when in use wings 2 and 4 are firmly fastened to each other, as well as to the hanger, and as wing 2 besides being suspended from the hanger or rotating support 11 is pivoted to the bottom by means of the pivot 29 and its floor-socket the wings may be rotated with the utmost ease.

In addition to the locking means already described wings 2 and 4 are each provided with an additional locking means. (Shown in dotted lines in Fig. 1 and designated by the numeral 35.) This locking mechanism is shown more particularly in Figs. 3 to 8, inclusive, and comprises the locking-pivots 35 35 at opposite ends of the outer extremities of the wings 2 and 4. These pivots work through sockets 35ª into the ceiling and floor plates 38. The pivots 35 are connected to two operating-rods 39, one of which is connected to a sliding plate 34, while the other is connected to an arm 34ª, this plate and arm being pivotally connected together, as shown in Figs. 4 and 6. Projecting from the plate is a crank-pin 36, whose arm 37 rotates with a revolving disk 40, working through the face-plate 41. The construction is such that when a tool is placed within the socket in the revolving plate 40 the parts may be operated to simultaneously move the pivots 35 35 up and down, according to the direction in which the plate 40 is rotated. In other words, when the plate 40 is moved in one direction the upper pivot 35 is projected upward, while the other pivot 35 is simultaneously projected downward, thus locking the outer extremities of the wings 2 and 4 to the floor and ceiling. On the other hand, when the plate 40 is rotated in the opposite direction the pivots 35 are withdrawn from the ceiling and floor sockets 38, thus releasing the wings, as will be readily understood.

The operation of unshipping and moving aside of the wings is accomplished as follows: Assuming that the parts are in the position shown in Figs. 1 and 2, the latches 31 of Figs. 22 and 24 are first withdrawn, so as to permit the drop-arms 5 to be released and to swing downward. After this is done the wings 1 and 3 may be swung on their hinges, so as to fold against the wings 2 and 4, as shown in dotted lines in Fig. 1. The wings 2 and 4 may now be rotated on the hanger or rotatable support 11 until the pivots 35 in the outer extremities of said wings come into alinement with the ceiling and floor sockets 38. The face-plate 40 is now rotated to project these pivots 35 into the sockets 38, thus holding the wings from further rotation on the hanger or rotating support. The operator now uses the same handle by which the plate 40 was rotated, so as to unlock the wing 4 from the wing 2, and then the same handle may be again used to operate the plate 27 to withdraw the lower pivot 29 and simultaneously unlock the wing 2 from the hanger or rotating support 11. The wing 4 is then unlocked from the hanger by operating the locking-arm 13 at the right of Fig. 14 by means of the rod 21. After this is done the wings may be swung into the position shown in dotted lines in Fig. 1. It will be manifest that when it is desired to assemble the parts ready for winter use the operation is the reverse of that just described.

What I claim as new is—

1. In a door structure, the combination of two separable sections, each section comprising a pair of wings capable of being brought into substantial parallelism, a casing having concaved walls, said wings being substantially of the same curvature as the casing-walls, and being constructed and arranged to be moved aside when separated into positions substantially parallel with the walls of the casing.

2. In a door structure, a casing having concaved walls, a rotary door comprising wings foldable on each other and having substantially the same curvature as the walls of the casing, and means for permitting said wings to be moved into parallelism with the curve of the casing-wall.

3. In a door structure, the combination of two separable sections, each section comprising a pair of foldable wings and a casing having concaved walls, said wings being substantially of the same curvature as the casing-walls and the sections constructed and adapted to be swung aside when separated into positions substantially parallel with the walls of the casing.

4. In a door structure, the combination of two separable sections, each section comprising a pair of foldable wings and a casing having concaved walls, said wings being substantially of the same curvature as the walls of the casing and the sections constructed and adapted to be swung aside into positions substantially parallel with the walls of the casing when separated, a rotatable support and means for locking one at least of said sections to said rotatable support.

5. In a door structure, the combination of two separable sections, each section comprising a pair of foldable wings which fold against each other from a point at or near the center of the door structure and a casing, a central rotatable bearing, means for locking one at least of said sections to said bearing and said sections provided with means at or near their outer edges upon which they are capable of swinging as centers when the sections are separated.

6. In a door structure, the combination of two separable sections, each section comprising a pair of foldable wings which fold against each other from a point at or near the center of the door structure and a casing, a central rotatable bearing, means for locking said sections together and one at least of them to the rotatable bearing, projectable means at the outer edges of said sections at the top and bottom of the sections upon which the latter are capable of being swung as centers when the sections are separated, and fixed sockets in position to receive the projectable means.

7. In a door structure, the combination of two separable sections, each section comprising a pair of foldable wings and a casing having concaved walls, a central rotatable bearing, means for locking said sections together and one at least of them to the rotatable bearing, said wings being substantially of the same curvature as the casing-walls and the sections constructed and adapted to be swung into positions substantially parallel with the walls, and projectable means at the outer edges of the sections upon which the sections are capable of being turned as centers when separated.

8. A door structure comprising two sections, each section comprising two radial wings hinged together, the inner edges of the sections detachably connected together at the center, the entire structure normally supported by a central pivot from which it is detachable and means located at the outer edge of each section which are made the sole pivotal support of said sections when the latter are separated and swung out of the passageway.

9. In a door structure, the combination of separable sections, each of which comprises a pair of wings hinged together and foldable against each other from a point at or near the center of the door structure, means for locking said sections together, means for locking one of the sections to a central rotatable support and pivots at the outer edges of each of said sections upon which the sections are capable of being swung when separated from each other.

10. In a door structure, the combination of separable sections, each of which comprises two wings hinged together, means for locking said sections together, a central rotatable support, means for locking one of said sections to said support, pivots at the outer edges of said sections whereon the latter are swung as pivots when separated from each other, said wings being of curved form approximately corresponding with the wall of the casing, thereby increasing the free space within the casing when the sections are folded.

11. In a door structure, the combination of sections, each section comprising two foldable wings, hinged to each other at or near the center of the door structure, a hanger on which said sections are detachably suspended at the center of the door structure, a rock-shaft having a crank-arm for locking one of said sections to said hanger, a bottom pivot in alinement with the hanger for said sections, said hanger and pivot affording a bearing upon which the door turns, and means for simultaneously operating said rock-shaft and said lower pivot to provide or do away with the bearing at the center of the door.

12. In a door structure, the combination of sections, each section comprising two parts, hinged to each other at or near the center of the door structure, a hanger on which said sections are detachably suspended at the center of the door structure, a rock-shaft having a crank-arm for locking one of said sections to said hanger, a bottom pivot in alinement with the hanger for said sections, said hanger and pivot affording a bearing upon which the door turns, and means for simultaneously operating said rock-shaft and said lower pivot, to provide or do away with the bearing at the center of the door, pivots at the outer edges of said sections and means for actuating said pivots to afford bearings for said sections, whereby when the center means is unlocked, the sections may be swung on the pivots at the outer edges thereof.

13. In a door structure, the combination of a circular casing and segmental curved wings hinged together in pairs separably united at a common center, and means for swinging said wings from an edge outward toward said casing so that when in such position their curves will approximately conform with the curve of the casing.

14. In a door structure, the combination of a ball-bearing hanger or rotatable support having a member 11 projecting downward with slots therein, a wing having a crank rock-shaft and a crank-arm coacting with one of said slots to lock said wing to said member 11 and means comprising a rock-shaft and a crank-arm for locking a second wing to the first-mentioned wing.

15. In a door structure, the combination of separable sections, each section comprising two parts hinged together at or near the center of the door structure, means for locking said sections together, and means for locking one of said sections to a central rotatable support, said means comprising a rock-shaft having a locking-arm, a lower pivot and floor-socket, a sliding plate, rods connecting said plate with said rock-shaft and lower pivot, a rotatable face-plate having a socket, and a crank-pin connecting said rotatable plate with said sliding plate, whereby said sections may be unlocked simultaneously from said rotatable support and from said floor-socket.

16. In a door structure, the combination of separable sections, means for locking them together, each section comprising two wings hinged together at or near the center of the door structure, a rotatable hanger or support to which said sections are attached, a central pivot at the lower edge of said sections and means for simultaneously detaching said sections from the hanger and withdrawing said pivot.

BURNS HULL UHRICH.

Witnesses.
WILLIAM R. LLOYD,
THOMAS W. LLOYD.